United States Patent
Balasubramanian et al.

(10) Patent No.: US 11,546,722 B2
(45) Date of Patent: ***Jan. 3, 2023

(54) ENHANCEMENTS TO EHPLMN SCANS IN CELLULAR NETWORKS

(71) Applicant: Celona, Inc., Cupertino, CA (US)

(72) Inventors: Srinivasan Balasubramanian, San Diego, CA (US); Mehmet Yavuz, Palo Alto, CA (US)

(73) Assignee: Celona, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/168,700

(22) Filed: Feb. 5, 2021

(65) Prior Publication Data
US 2021/0250725 A1 Aug. 12, 2021

Related U.S. Application Data

(60) Provisional application No. 62/971,847, filed on Feb. 7, 2020.

(51) Int. Cl.
*H04W 76/11* (2018.01)
*H04W 4/021* (2018.01)
*H04W 84/04* (2009.01)

(52) U.S. Cl.
CPC ........... *H04W 4/021* (2013.01); *H04W 76/11* (2018.02); *H04W 84/042* (2013.01)

(58) Field of Classification Search
CPC ..... H04W 4/021; H04W 48/04; H04W 48/10; H04W 48/14; H04W 48/16; H04W 48/18; H04W 48/20; H04W 76/11; H04W 84/042
See application file for complete search history.

(56) References Cited

U.S. PATENT DOCUMENTS

| | | | |
|---|---|---|---|
| 9,313,643 B1 * | 4/2016 | Ghoshal | H04W 60/04 |
| 2012/0322446 A1 * | 12/2012 | Ramachandran | H04W 48/18 |
| | | | 455/436 |
| 2013/0109377 A1 * | 5/2013 | Al-Khudairi | H04W 48/16 |
| | | | 455/432.1 |

(Continued)

OTHER PUBLICATIONS

Young, Lee, International Search Report and Written Opinion received from the USRO dated Apr. 23, 2021 for appln. No. PCT/US2021/016622, 17 pgs.

*Primary Examiner* — Jean A Gelin
(74) *Attorney, Agent, or Firm* — Jaquez Land Greenhaus & McFarland LLP; Bruce W. Greenhaus, Esq.

(57) ABSTRACT

A User Equipment (UE) device, such as a cellular telephone, configured to store Higher Priority Public Land Mobile Network (HPPLMN) timer setting values and enterprise geofence information associated with the entries on its Equivalent Home Public Land Mobile Network (EHPLMN) list is disclosed. When the UE is camped on an EHPLMN, the UE may search/scan for higher priority EHPLMNs using the HPPLMN timer setting values associated with the entries on the list that have higher priority than the current EHPLMN. The rate of the scans may be set based on the shortest HPPLMN timer entry of the higher priority entries on the EHPLMN list. The UE may also or instead be configured to search for geofenced EHPLMNs on the list for which entrance criteria are currently satisfied, even when the current EHPLMN has higher priority than the geofenced EHPLMNs.

20 Claims, 5 Drawing Sheets

(56) References Cited

U.S. PATENT DOCUMENTS

| | | | |
|---|---|---|---|
| 2014/0011498 A1* | 1/2014 | Aono | H04W 36/30 |
| | | | 455/432.1 |
| 2014/0031033 A1* | 1/2014 | Juang | H04W 48/18 |
| | | | 455/432.1 |
| 2014/0155061 A1* | 6/2014 | Kherani | H04W 48/16 |
| | | | 455/434 |
| 2015/0072679 A1 | 3/2015 | Wirtanen et al. | |
| 2016/0057686 A1* | 2/2016 | Yang | H04W 48/18 |
| | | | 370/332 |
| 2017/0094589 A1* | 3/2017 | Bhasin | H04W 48/18 |
| 2017/0223623 A1* | 8/2017 | Cao | H04W 48/02 |
| 2017/0346746 A1* | 11/2017 | Zhang | H04L 47/24 |
| 2018/0160298 A1* | 6/2018 | Wang | H04W 48/20 |
| 2019/0159101 A1* | 5/2019 | Yu | H04W 48/16 |
| 2019/0394719 A1* | 12/2019 | Soliman | H04W 48/18 |
| 2021/0160774 A1* | 5/2021 | Nagar | H04W 52/0254 |
| 2021/0321326 A1 | 10/2021 | Balasubramanian et al. | |

* cited by examiner

ENHANCEMENTS TO EHPLMN SCANS IN CELLULAR NETWORKS

CROSS-REFERENCE TO RELATED APPLICATION

This application claims priority to U.S. Provisional Patent Application Ser. No. 62/971,847, entitled ENHANCEMENTS TO EHPLMN SCANS IN 4G LTE AND 5G NR NETWORKS, filed Feb. 7, 2020, which is hereby incorporated by reference in its entirety as if fully set forth herein, including Specification, Figures, Claims, and all other matter.

BACKGROUND

(1) Technical Field

The disclosed methods, apparatus, and articles of manufacture generally relate to systems for selecting a communications network. In particular, the disclosed methods, apparatus, and articles of manufacture relate to prioritizing the selection of a communications network based on a hierarchy of Public Land Mobile Network (PLMN) identification (ID) codes and enterprise network geofencing.

(2) Background

A Public Land Mobile Network (PLMN) is a combination of wireless communication services and an associated communications network. A PLMN typically consists of several cellular technologies like GSM/2G, UMTS/3G, LTE/4G, offered by a single operator within a given country, often referred to as a cellular network. In cellular communication systems, such as 4G LTE (Fourth Generation Long Term Evolution) and 5G NR (fifth Generation New Radio) networks, the base stations (e.g., an extended Node B (eNB) in 4G or a gNodeB in 5G) operated by a service provider, such as a mobile network operator (MNO), transmit a unique identifier called a PLMN identifier (ID) as part of their wireless transmissions. The PLMN ID serves as a global identifier for the PLMN of the MNO. A device with wireless connectivity typically stores one or more lists of PLMN IDs of networks (i.e., PLMNs) from which the device is authorized to receive services. A device with wireless connectivity is commonly referred to as User Equipment or a UE. When a UE searches for service, it uses its PLMN ID lists to decide if that UE is allowed to receive service from a particular transmitter operated by a particular MNO.

An Equivalent Home PLMN (EHPLMN) is a network that is equivalent to the home PLMN for a particular UE. One of the PLMN lists that a UE maintains is a list of EHPLMN IDs, known as the EHPLMN list. Other PLMN lists include a home PLMN (HPLMN) list, a User PLMN (UPLMN) list, and an operator PLMN (OPLMN) list. The EHPLMN list may be maintained in a Universal Subscriber Identity Module (USIM) file within the UE that lists the EHPLMNs. The EHPLMN list may also contain the HPLMN code for the HPLMN derived from the International Mobile Subscriber Identity (IMSI) number. If the HPLMN code derived from the IMSI is not present in the EHPLMN list, then the HPLMN is treated as a Visited PLMN (VPLMN) for PLMN selection purposes. In one example, when a UE with a Subscriber Identification Module (SIM card) associated with a particular MNO is outside the coverage area of the home MNO (i.e., roams into the coverage of a different MNO), the UE will look to the EHPLMN list to determine whether the different MNO's PLMN ID is in the EHPLMN list stored in the UE. If so, then the network associated with that PLMN ID is said to be an EHPLMN of the UE and the UE may choose to receive service from the different MNO.

The UPLMN list is a list of PLMNs that are designated by the user and can be prioritized by the user. The OPLMN list is a list of PLMNs that are designated by the operator and that can be prioritized as well.

The EHPLMN list in the UE can support multiple entries (i.e., the list may include the PLMN IDs of several different MNOs); each EHPLMN is listed in the order of the priority given to the MNO associated with the EHPLMN. Accordingly, the first EHPLMN in the EHPLMN list will identify the EHPLMN associated with the MNO from which service is most preferred to be provided for that UE. Each MNO associated with an EHPLMN on the list will be preferred over those MNOs associated with other EHPLMNs that are lower on the list. When the HPLMN list has such entries, the MNO associated with the HPLMN is typically listed as the highest priority entry.

Both received signal strength and PLMN configuration may play a role in cell selection. Whether the particular PLMN is an HPLMN, EHPLMN, User-defined PLMN, OPLMN or Registered PLMN (RPLMN) may determine to some degree the priority of the MNO associated with that PLMN.

One option for determining the MNO (and more particularly, the cell) from which the UE receives service is the so-called "manual mode" selection technique. In the manual mode, the UE presents the user a list of available PLMNs and, upon the user's selection, the UE attempts to enter the MNO selected by the user. The UE tries to remain on that network (i.e., attempts to continue to receive service from the MNO operating that network) even when the UE moves out of the coverage area for that network. The UE does not attempt to find another MNO from which to receive service.

Another option is the "automatic mode" selection technique. In automatic mode, the particular PLMN used to identify the desired MNO is selected based on a predefined rule specified in the 3GPP standard. While the 3GPP standard provides overall guidelines, the detailed implementation of the process is determined by the UE manufacturer and the requirements provided by each specific MNO.

The general guidelines regarding selection of the PLMN are as follows:
  i) Select the cell with HPLMN (Home PLMN) or EHPLMN (Equivalent HPLMN); and
  ii) If the UE loses the selected HPLMN or EHPLMN coverage, then the UE tries to find a PLMN associated with a VPLMN code.

There is a need in the art for additional efficient and effective techniques for selecting among the PLMNs identified in the PLMN lists of a UE.

SUMMARY

This document discloses techniques for addressing one or more of the needs identified above, and/or other needs. Selected embodiments disclosed in this document include methods, apparatus, and articles of manufacture that enable improved Equivalent Home Public Land Mobile Network (EHPLMN) scanning techniques by User Equipment (UE), including reversal of certain PLMN priorities on a UE's EHPLMN list, and scanning for geofenced PLMNs on the list in preference to non-geofenced PLMNs, even when the non-geofenced PLMNs have higher priority than the geofenced PLMNs.

In some embodiments, a method of operating UE includes determining that the UE is camped on an EHPLMN associated with a current entry in an EHPLMN list of the UE. If the current entry is not a geofenced EHPLMN entry (i.e., an entry associated with a geofenced EHPLMN), then the UE scans for an EHPLMN associated with a geofenced EHPLMN entry on the EHPLMN list. If the current entry is a geofenced EHPLMN entry, then the UE determines whether the current entry has the highest priority of all geofenced EHPLMN entries on the EHPLMN list. If the current entry has the highest priority of all geofenced entries on the EHPLMN list, then the UE discontinues scanning for an EHPLMN. If the current entry is a geofenced entry that does not have the highest priority of all geofenced entries on the EHPLMN list, then the UE scans for an EHPLMN associated with a geofenced entry on the EHPLMN list having a higher priority than the current entry.

In some embodiments, the method of operating UE includes camping the UE on an EHPLMN associated with a current entry in an EHPLMN list of the UE and determining the UE's geolocation. In response to the current entry not being a geofenced EHPLMN entry, the UE scans for an EHPLMN associated with a geofenced EHPLMN entry on the EHPLMN list for which the UE meets entrance criteria. In response to the current entry being a geofenced EHPLMN entry, the UE determines whether the current entry has the highest priority of all geofenced EHPLMN entries meeting the entrance criteria on the EHPLMN list. In response to the current entry having the highest priority of all geofenced entries on the EHPLMN list among geofenced entries that meet the entrance criteria, the UE discontinues scanning for an EHPLMN. In response to the current entry being a geofenced entry that does not have the highest priority of all geofenced entries on the EHPLMN list that meet the entrance criteria, the UE scans for an EHPLMN associated with a geofenced entry on the EHPLMN list having a higher priority than the current entry and also meeting the entrance criteria.

In some embodiments, a UE includes memory storing machine-executable instructions and an EHPLMN list, at least one transceiver such as a cellular transceiver, and at least one processor coupled to the memory and to the at least one transceiver. Under the control of the instructions, the processor configures the UE to camp the UE on an EHPLMN associated with a current entry in an EHPLMN list of the UE. The processor also configures the UE to determine whether the current entry is (i) a non-geofenced EHPLMN entry, (ii) the highest priority geofenced EHPLMN entry having the highest priority of all geofenced EHPLMN entries on the EHPLMN list, or (iii) a lower priority geofenced EHPLMN entry having priority lower than the highest priority of all geofenced EHPLMN entries on the list. In response to the current entry being the highest priority geofenced EHPLMN, the UE discontinues scanning for an EHPLMN. In response to the current entry being a lower priority geofenced EHPLMN entry having priority lower than the highest priority of all geofenced EHPLMN entries on the list, the UE scans for an EHPLMN associated with a higher priority geofenced entry on the EHPLMN list than priority of the current entry. In response to the current entry not being a geofenced entry, the UE scans for an EHPLMN associated with a geofenced entry on the EHPLMN list.

In some embodiments, a non-volatile machine-readable storage medium stores program code instructions. The instructions instruct the processor to configure a UE to camp on an EHPLMN associated with a current entry in an EHPLMN list of the UE. The instructions also instruct the processor to configure the UE to determine the geolocation of the UE and to determine whether the UE meets entrance criteria for geofenced entries on the EHPLMN list of the UE. In response to the current entry not being a geofenced EHPLMN entry, the UE scans for an EHPLMN associated with a geofenced EHPLMN entry on the EHPLMN list for which the UE meets the entrance criteria. In response to the current entry being a geofenced EHPLMN entry, the UE determines whether the current entry has the highest priority of all geofenced EHPLMN entries meeting the entrance criteria on the EHPLMN list. In response to the current entry having the highest priority of all geofenced entries on the EHPLMN list among geofenced entries that meet the entrance criteria, the UE discontinues scanning for an EHPLMN. In response to the current entry being a geofenced entry that does not have the highest priority of all geofenced entries on the EHPLMN list that meet the entrance criteria, the UE scans for an EHPLMN associated with a geofenced entry on the EHPLMN list having a higher priority than the current entry and also meeting the entrance criteria.

Various features and aspects will be better understood with reference to the following detailed description, drawings, and claims.

BRIEF DESCRIPTION OF THE DRAWINGS

The disclosed methods, apparatus, and articles of manufacture in accordance with one or more various embodiments, are described with reference to the following drawings. The drawings are provided for purposes of illustration only and merely depict examples of some embodiments of the disclosed methods, apparatus, and articles of manufacture. When the drawings are reviewed in conjunction with a careful perusal of this specification, they facilitate the reader's understanding of the disclosed techniques. The drawings should not be considered to limit the breadth, scope, or applicability of this description. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

Figure 1:
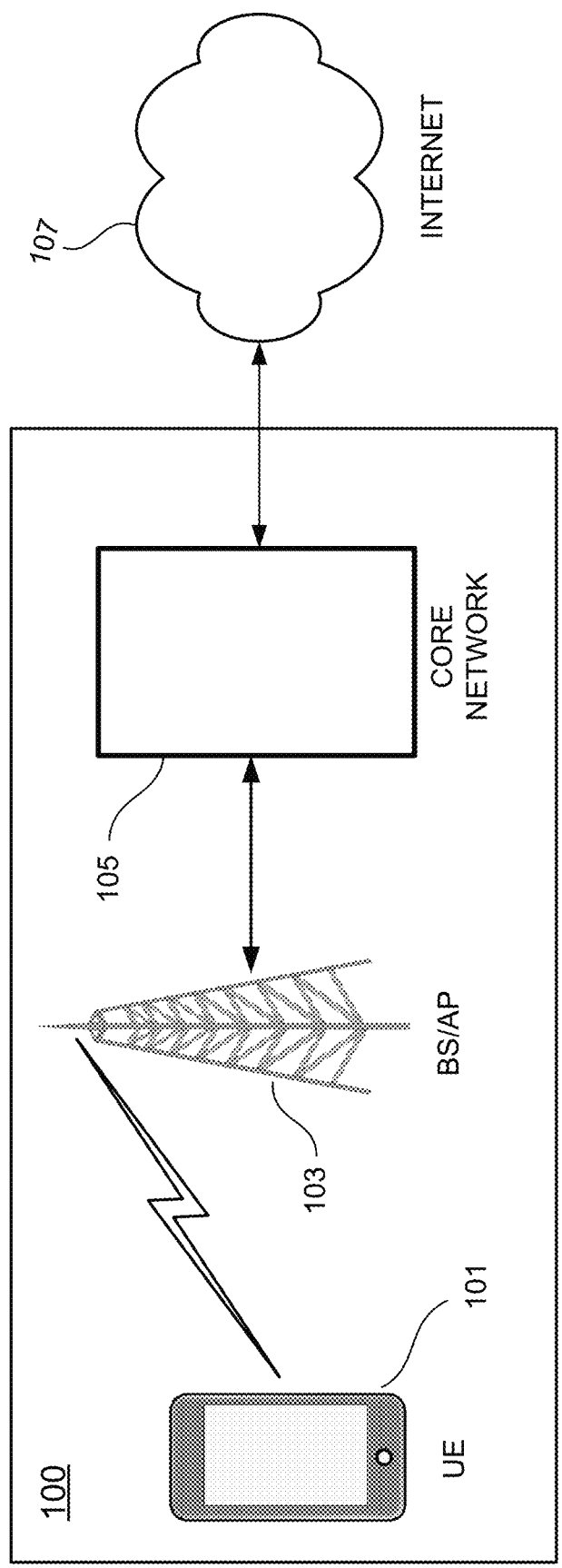
FIG. 1 is a diagram showing selected parts of a communication network configured in accordance with selected features described in this document.

FIG. 1 illustrates selected parts of a communication network 100, such as a "4G LTE" (fourth generation Long-Term Evolution) or "5G NW" (fifth generation New Radio) network. As shown in FIG. 1, the network 100 includes user equipment (UE) 101, a base station/access point (BS/AP) 103, and a core network 105. One of the advantages of such networks is their ability to provide communications to and from multiple wireless devices and provide these wireless devices with access to a large number of other devices and services via the wireless connections to the BS/AP 103 of the network 100.

The UE 101 may be, for example, a cellular smartphone, an Internet of Things (IoT) apparatus, virtual reality goggles, smart glasses (Google glass), a tablet, a computer (laptop, desktop), a vehicle (conventional, autonomous, semi-autonomous), a robotic device, a wireless sensor (fixed, mobile), a health/fitness monitor, or a barcode scanner. This enumeration of UE types is illustrative; many other wireless devices may be UEs. The UE 101 may include, within its enclosure, one or more processors, modems, transceivers (e.g., cellular, Bluetooth®, etc.), storage and memory (e.g., random access memory, dynamic random access memory, read-only memory, volatile memory, non-volatile memory, etc.), cameras, screens (e.g., cathode ray tubes, touch-sensitive liquid crystal displays, etc.), acceleration sensors, speakers, microphones, batteries, and other devices.

The BS/AP 103 is configured to receive cellular radio frequency (RF) signals from, and send RF signals to, the UE 101. The BS/AP 103 may include an extended Node B (eNB) of an LTE/4G network, a gNodeB of a 5G network, a cellular base station (BS), or a Citizens Broadband Radio Service Device (CBSD) (which may be an LTE or 5G device). The BS/AP 103 may also include WiFi access node capability, Local Area Network (LAN) access point capability, Wide Area Network (WAN) access point capability, and other functionality. Additionally, a BS/AP may include other network receiving hubs that provide access to networks of a plurality of wireless transceivers within range of the BS/AP. Typically, the BS/APs are used as transceiver hubs, whereas the UEs are used for point to point communication and are not used as hubs. As is illustrated in FIG. 1, the BS/AP 103 is coupled to the Core Network 105. Thus, the BS/AP 103 connects the UE 101 to the Core Network 105, and through it to various other networks such as the Internet 107, a Public Switched Telephone Network (PSTN, not shown), cellular networks of other Mobile Network Operators (MNOs) (also not shown), and still other networks. In this configuration, the UE 101 can access (send information to and/or receive information from) various devices and services within the Core Network 105, Internet 107, and/or other networks. Wireless data transmission between the UE 101 and the BS/AP 103 may take place on an assigned channel, such as a specific frequency and assigned code division multiple access (CDMA) code. Data transmission between the BS/AP 103 and the Core Network 105 may use any appropriate communication media and standards (e.g., wireless, cable, fiber optic, and so forth).

The Core Network 105 may also provide control of the air interface between the BS/APs (e.g., the BS/AP 103) and various UEs (e.g., the UE 101). The Core Network 105 may also coordinate the BS/APs to minimize interference within the network.

A private corporate or enterprise network is a computer network owned and/or operated by an entity (e.g., a business entity such as a corporation) that interconnects various computing devices of the entity. An enterprise network may provide access to the entity's resources (e.g., hardware, software) and may provide entity-specific communication security. An entity may be a virtual private network providing intranet-based connections and extranet-based connections. The connections may link, for example, sites, computers, and other communication devices.

UEs 101 maintain an Equivalent Home Public Land Mobile Network (EHPLMN) list of EHPLMN Identifiers (IDs). Each EHPLMN ID in the list identifies an MNO that is equivalent to the MNO associated with the PLMNs from which the UE is authorized to receive service. The list is prioritized. MNOs tend to specify the HPLMN as the highest priority entry. With the introduction of enterprise networks, one or more HPLMN IDs stored in the UE may identify an enterprise network's BS/APs 103. The entity controlling an enterprise network may prefer to have its communications flow through the enterprise network even when another network is available. This preference may be accommodated by allowing the enterprise's PLMN ID(s) to be seen as having a higher priority than all the other EHPLMN IDs on the UE's list, causing the UE to camp on the enterprise system's PLMN and communicate through the corresponding BS/AP(s), although PLMNs associated with other EHPLMN IDs are available.

When a UE 101 is camped on a PLMN associated with a PLMN ID that has a lower priority in the EHPLMN list, the 3GPP standards currently do not mandate looking for a more preferred system in the EHPLMN list. To cause the UE 101 to prefer the PLMNs transmitting the enterprise's PLMN ID over other PLMNs transmitting MNO EHPLMN IDs, the UE may need to scan and search for the enterprise PLMN ID when the UE is camped on another PLMN, such as an MNO's PLMN. The UE may have a "Higher Priority PLMN (HPPLMN) timer" that determines the period of the UE's scans/searches for higher priority EHPLMNs. In other words, when the UE is camped on a PLMN associated with an EHPLMN ID that does not have the highest priority on the EHPLMN list, the UE looks for EHPLMN IDs with higher priority than the current EHPLMN ID, with the period of the scans controlled by the HPPLMN timer. In some embodiments, the UE such as the UE 101 is configured to set up the HPPLMN timer and perform periodic scans for PLMNs associated with higher-priority EHPLMN IDs when the UE is camped on a PLMN that is associated with an EHPLMN ID that does not have the highest priority on the UE's EHPLMN list.

Figure 2:
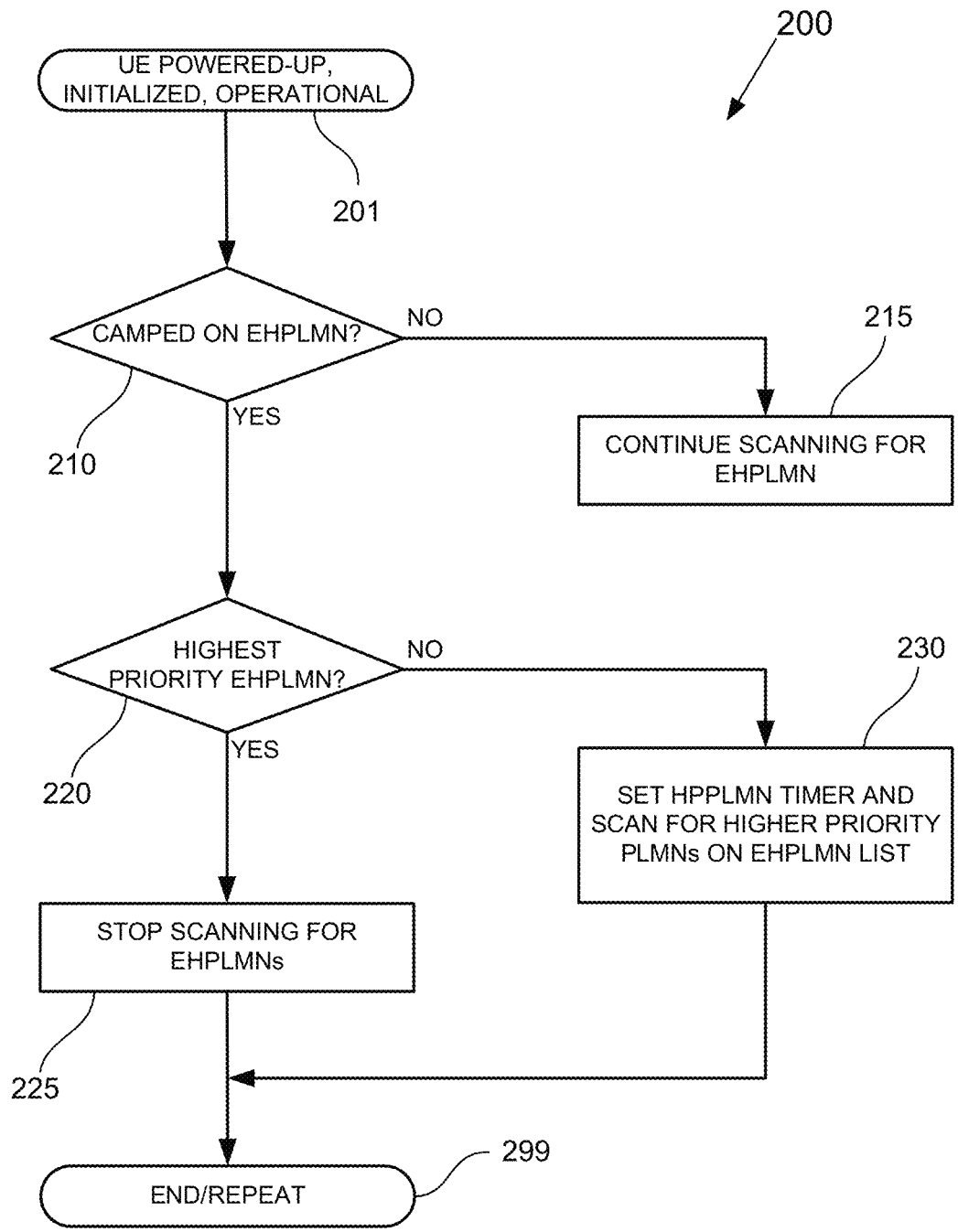
FIG. 2 is a flowchart showing selected steps of a process for selecting an EHPLMN for operation of a User Equipment device.

However, periodic scans cause battery drain, which is an incentive to use relatively long period HPPLMN timer. Excessively long periods, on the other hand, prevent prompt switching to higher-priority EHPLMN IDs when they become available, which is also undesirable. In some embodiments, therefore, the period of scans as determined by the HPPLMN timer may be dynamically adjusted, for example, based on the UE's location, the state of UE's battery charge, the availability of other UE resources (e.g., computational, communication), the geolocation of the UE, the RF environment, the user's and/or the enterprise's choices, and other factors and considerations. FIG. 2 shows selected steps of a process 200 illustrating this technique.

At step 201, the UE is powered up, initialized, and operational.

In step 210, the UE determines whether the UE is camped on an EHPLMN. (Here and throughout this document, actions of the UE are generally performed/controlled by the UE's processor, or one of UE's processors, executing the code stored in a memory of the UE, and interacting with other components of the UE). If the UE is not camped on an EHPLMN, process flow continues towards step 215, in which the UE continues scanning for an EHPLMN. In some embodiments, the scanning period (determined by the HPPLMN timer value) may remain the same as before the process 200 began. In other embodiments, the HPPLMN timer value is changed to a predetermined value. In still other embodiments, the HPPLMN is dynamically set in step 215 based, for example, on the UE's location, the state of UE's battery charge, the availability of other UE resources (computational, communication), the geolocation of the UE and/or satisfaction of entrance criteria (entrance requirements) of an enterprise PLMN, the RF environment, and/or other parameters.

If the UE is camped on an EHPLMN, as determined in step 210, the process flow proceeds to step 220, in which the UE determines whether the EHPLMN on which it is camped is a PLMN associated with the EHPLMN ID having the highest priority on the EHPLMN list (hereafter referred to as the "highest priority PLMN"). The highest priority PLMN may be, for example, a PLMN of an enterprise associated with the UE. If the UE is camped on the highest priority PLMN, the process flow proceeds to step 225, in which the UE stops EHPLMN scans. For example, the UE sets its HPPLMN timer to a value that corresponds to no scanning, which is zero in some embodiments. The UE may also or instead disable scanning for PLMNs in another manner. Furthermore, in embodiments, the UE may instead modify scanning frequency, for example, by increasing the value of the HPPLMN timer and thus decreasing the scan frequency.

The process 200 may then terminate at step 299 and may be repeated as needed or desired.

If the UE is camped on an EHPLMN that is not the highest priority PLMN, as is determined in the step 220, the process flow proceeds to step 230. Here, the UE enables EHPLMN scans or allows the EHPLMN scans to continue. For example, the UE sets the HPPLMN timer to a value that causes the UE to search for higher priority PLMNs. The value to which of the HPPLMN timer is set may be predetermined and/or dynamically adjusted. In the latter case, the value may depend on one or more of the factors enumerated above (the UE's coordinates, battery charge level, resource availability, RF environment, satisfaction of the enterprises entrance requirements, the choices of the UE's user and the enterprise), and possibly other factors or considerations.

The process 200 may then terminate at the step 299 and may be repeated as needed or desired.

In some embodiments, the EHPLMN IDs on the EHPLMN list are associated with different HPPLMN timer values. For example, N EHPLMN IDs on the EHPLMN list are prioritized in order as $ID_1$, $ID_2$, ... $ID_N$, with the $ID_1$ being the highest priority entry. Some or all of the entries are associated with a respective corresponding HPPLMN timer value: $T_1$, $T_2$, ... $T_N$. This is illustrated in Table 1 below. Here, each PLMN ID (top row) is associated with a scan timer value (bottom row). Note that there are N pairs on the list, where N may be any whole number greater than zero. Note also that for some IDs, the timer value may indicate that no change in the HPPLMN is needed or that the particular PLMN ID does not require scanning when the UE is camped on another EHPLMN (in the latter case, such value may be, for example, zero). Further, as will be discussed below, there may be additional information associated with some or all of IDs in the table. In other words, there may be additional rows in the table.

TABLE 1

| $ID_1$ | $ID_2$ | ... | $ID_N$ |
|--------|--------|-----|--------|
| $T_1$  | $T_2$  | ... | $T_N$  |

Figure 3:
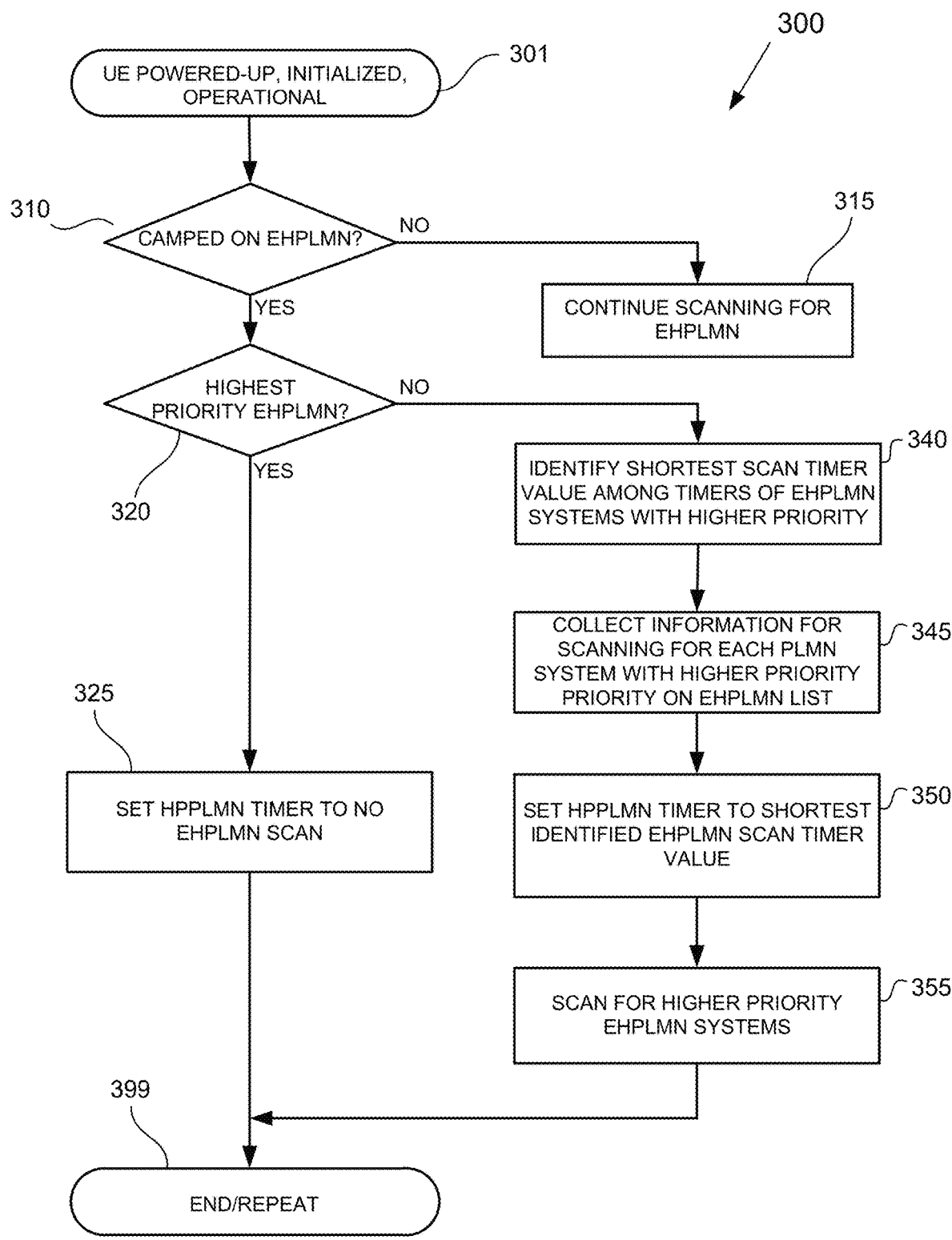
FIG. 3 is a flowchart showing selected steps of another process for selecting an EHPLMN for operation of a User Equipment device.

In these embodiments, the HPPLMN timer may be adjusted based on the values $T_i$ for one or more of the EHPLMN ID entries having a higher priority on the EHPLMN list than the EHPLMN ID associated with PLMN on which the UE is currently camped. Accordingly, the HPPLMN timer can be dynamically set or adjusted based on the relative priority of the current PLMN with respect to the priorities of the other EHPLMN IDs on the EHPLMN list. In some embodiments, when the UE is camped on a PLMN associated with an EHPLMN ID having a priority that is lower than at least one of the other entries in the EHPLMN list, the shortest period HPPLMN timer associated with those EHPLMN IDs having higher priority is used. As has already been mentioned, a HPPLMN timer value may be set to indicate that the EHPLMN scans should not be performed even when the current camped PLMN ID has a lower priority on the EHPLM list than some (or even all) of the other PLMN IDs. FIG. 3 shows selected steps of a process 300 illustrating this technique.

At step 301, the UE is powered up, initialized, and operational.

In step 310, the UE determines whether the UE is camped on an EHPLMN. If the UE is not camped on an EHPLMN, the UE continues scanning for an EHPLMN, in step 315. In some embodiments, the scanning period (controlled by the HPPLMN timer value) may remain the same as before the process 300 began. In other embodiments, the HPPLMN timer value is changed to a predetermined value that is associated with scanning for an EHPLMN when the UE is not camped on EHPLMN. In still other embodiments, the HPPLMN is dynamically set in step 315, based, for example, on the UE's location, the state of UE's battery charge, the availability of other UE resources, the RF environment, the satisfaction or non-satisfaction of entrance requirements of geofenced PLMN(s) on the UE's EHPLMN list, and/or other variables.

If the UE is camped on an EHPLMN, the process flow proceeds to step 320, in which the UE determines whether the EHPLMN on which it is camped is the highest priority PLMN on the EHPLMN list. The highest priority PLMN may be a PLMN of an enterprise associated with the UE. If the UE is camped on the highest priority PLMN, the process flow proceeds to step 325, in which the UE sets the HPPLMN timer to a value that corresponds to no scanning (e.g., to zero). The UE may also or instead disable scanning for PLMNs in another manner.

The process 300 may then terminate at step 399 and may be repeated as needed or desired.

If the UE is camped on an EHPLMN that is not the highest priority PLMN, the process flow advances from the step 320 to step 340, in which the UE identifies the shortest period timer value associated with the EHPLMN IDs having a higher priority than the EHPLMN ID on which the UE is camped.

In step 345, the UE collects information for scanning for the EHPLMN IDs with the higher priority.

In step 350, the UE sets the HPPLMN timer to the timer value identified in the step 340.

In step 355, the UE scans for the higher priority PLMNs on the EHPLMN list.

The process 300 may then terminate at the step 399 and may be repeated as needed or desired.

As a person skilled in the art would readily understand after reviewing this document, including the attached drawings, steps 310 through 325 of the process 300 may be identical, analogous, or similar to the corresponding and similarly-numbered steps 210 through 225 described above in relation to the process 200.

Geofencing refers to the use of a geofence. A geofence is a virtual boundary for a geographic area. Geofencing may be used with devices that have the ability to self-locate (i.e., be or become aware of their own current locations). Today, a typical smartphone has self-locating capability, and EHPLMN systems (such as enterprise EHPLMN systems) may use geofencing for EHPLMN selection.

Thus, another technique for managing EHPLMN selection and scans is to associate specific entries on the EHPLMN list with specific geofencing entity information. This is illustrated in Table 2 below. Note that there may be fewer or more entries in the EHPLMN list than the number of entries shown; and that there may be fewer or more geofenced EHPLMN IDs than the number of such entries shown in Table 2.

TABLE 2

| IDs | $ID_1$ | $ID_2$ | $ID_3$ | $ID_4$ | $ID_5$ | ... | $ID_N$ |
|---|---|---|---|---|---|---|---|
| timers | $T_1$ | $T_2$ | $T_3$ | $T_4$ | $T_5$ | ... | $T_N$ |
| GF flags | yes | no | no | yes | no | ... | yes |
| GF info | $INF_1$ | | | $INF_4$ | | ... | $INF_N$ |

The first two rows in Table 2 (IDs, timers) are similar to the first two rows of Table 1 discussed above. The third row values (GF flags) signify the presence (yes) or absence (no) of geofencing information associated with ID in the same column in the first row. The fourth row (GF info) contains information regarding the geofence for that ID. Thus, the EHPLMN $ID_1$ is associated with timer $T_1$, the "yes" flag signifying geofence presence for $ID_1$, and $INF_1$ is the information regarding this geofence; the EHPLMN $ID_2$ is associated with timer $T_2$ and the "no" flag signifies that there is no geofence associated with the EHPLMN $ID_1$.

In some embodiments, the geofence information in the table is sufficient for the UE to determine whether the requirements (criteria) for entrance into the geofence are satisfied (e.g., whether the UE is inside a geographic area defined by the geofence). The entrance criteria may include, for example, the UE's GPS coordinates being within a predetermined geofence boundary, sensing of a particular WiFi hotspot (or hotspots), sensing of predetermined macrocells and radio signatures/pilots of neighbor cells, notifications from the enterprise's computer system of swiping of a card (employee ID and such), sensing of predetermined RFIDs, receipt of notifications (such as notifications from the enterprise's computing system of an RFID sensor sensing the RFID associated with the UE), sensing of a particular Bluetooth™ reader/transmitter, and others.

Figure 4:
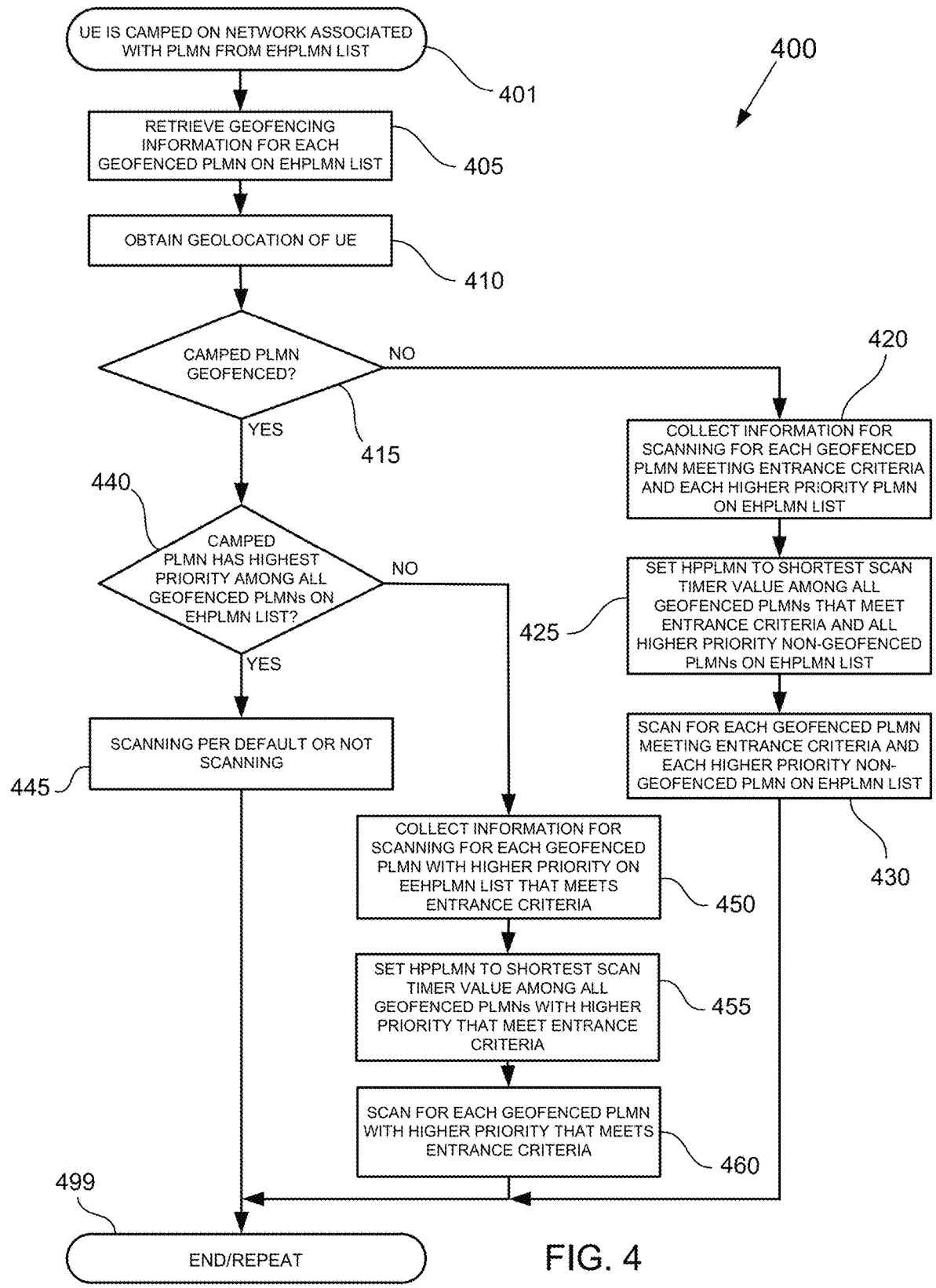
FIG. 4 is a flowchart showing selected steps of yet another process for selecting an EHPLMN for operation of a User Equipment device.

In some embodiments, a UE (such as the UE 101) stores a table such as the Table 2 described above and is configured to give preference to geofenced PLMN ID entries on its EHPLMN list. FIG. 4 shows selected steps of a process 400 illustrating this technique.

At step 401, the UE is powered up, initialized, operational, and camped on a system associated with an EHPLMN ID from the UE's EHPLMN list. The UE may camp on the EHPLMN ID using, for example, the processes 200 and 300 described above.

In step 405, the UE retrieves the geofencing information for all (or some) of the geofenced PLMN IDs on the UE's EHPLMN list. For example, the UE retrieves $INF_1$, $INF_4$, and $INF_N$ from Table 2.

In step 410, the UE self-locates. For example, the UE obtains its own GPS coordinates from its GPS sensor.

In step 415, the UE determines whether the EHPLMN on which it is camped has a geofence associated with it. To do this, the UE may compare the information regarding the geofences (the INF information, such as in the fourth row of Table 2) to its current state as it relates to the geofence's entrance requirements such as those described above.

If the EHPLMN is not associated with a geofence, process flow proceeds towards step 420, in which the UE collects information for scanning for each geofenced PLMN on the UE's EHPLMN list, and for each non-geofenced PLMN with a higher priority on the list than the current non-geofenced PLMN.

In step 425, the UE examines the HPPLMN timer values of the geofenced PLMNs on the EHPLMN list, and of non-geofenced PLMNs with higher priority than the currently-camped on EHPLMN on the list and selects the shortest of these timer values. (The shortest HPPLMN value corresponds to the highest scan/search rate.)

In step 430, the UE performs scan(s) using the information collected in the step 420, searching for the geofenced EHPLMNs and/or non-geofenced PLMNs with higher priorities on the list. If multiple scans are performed, they may be performed at the rate corresponding to the HPPLMN value selected in the step 425. In some embodiments, if an attempt to camp on a PLMN fails, a "block timer" is set to prevent any further attempt to camp onto that PLMN until a predetermined amount of time has elapsed. Attempts to camp onto other PLMNs may be made based on those networks that are detected upon performing the scan. In some embodiments, a block timer is set only for geofenced EHPLMNs. In other embodiments, a block timer is set for other EHPLMNs on the list as well.

The process 400 may then terminate at step 499 and may be repeated as needed or desired.

If the UE determines in the step 415 that the PLMN on which it is camped is geofenced, the process flow proceeds to step 440, in which the UE determines whether the PLMN on which it is camped has the highest priority among the geofenced PLMNs on the UE's EHPLMN list. The UE may examine and compare the relative priorities of the geofenced PLMNs on the list. If the PLMN on which the UE is camped has the highest priority from among the geofenced PLMNs on the list, the process flow proceeds towards step 445. Here, the UE may stop scanning, for example, by setting the HPPLMN timer to zero. The UE may also disable scanning by other means. In some embodiments, however, in step 445 the UE continues scanning in accordance with a predetermined default process. Preferably, such scans would be performed at a relatively low rate, such as a rate that is lower than the rate corresponding to the highest timer value in the EHPPLMN list by a factor of two or more. In other words, the rate here may correspond to timer value T of at least twice that of the highest timer value in the table.

The process 400 may then terminate at step 499, and may be repeated as needed or desired.

If the UE is not camped on the geofenced PLMN with the highest priority among the geofenced PLMNs on the list, as is determined in the step 440, the process flow proceeds to step 450. In this step, the UE collects the information needed for scanning for each geofenced PLMN on the UE's EHPLMN list and having a priority higher than the geofenced PLMN on which the UE is currently camped.

In step 455, the UE examines the HPPLMN timer values of the geofenced PLMNs on the EHPLMN list with higher priority than the current geofenced PLMN and selects the shortest of these timer values. (The shortest HPPLMN value corresponds to the highest scan/search rate.)

In step 460, the UE performs scan(s) using the information collected in the step 450, searching for geofenced EHPLMNs with higher priority on the list. If multiple scans are performed, they may be performed at the rate corresponding to the HPPLMN value selected in step 455.

The process 400 may then terminate at step 499, and may be repeated as needed or desired.

As a person skilled in the art would readily understand after reviewing this document. including the attached drawings, a UE performing embodiments of the process 400, effectively alters the PLMN priorities on its EHPLMN list by scanning for geofenced PLMNs on the list in preference to some or all of the non-geofenced PLMNs, even when the non-geofenced PLMNs have higher priority than the geofenced PLMNs. To conserve resources (e.g., battery charge), the UE may omit searching for EHPLMNs other than those indicated in the corresponding steps: in the step 430, the UE may omit scanning for EHPLMNs other than the EHPLMNs with the higher priority than the current EHPLMN and other than the geofenced EHPLMNs; and in the step 460, the UE may omit scanning for EHPLMNs other than the geofenced EHPLMNs with the higher priority than the current geofenced EHPLMN.

Although the process steps may be described serially in this document, certain steps and/or decisions may be performed by same and/or separate elements in conjunction or in parallel, asynchronously or synchronously, in a pipelined manner, or otherwise. There is no particular requirement that steps be performed in the same order in which this description lists them or the Figures show them, except where a specific order is inherently required, explicitly indicated, or is otherwise made clear from the context. Furthermore, not every illustrated step may be required in every embodiment in accordance with the concepts described in this document, while some steps that have not been specifically illustrated may be desirable or necessary for proper operation in some embodiments in accordance with the concepts. It should be noted, however, that specific embodiments/variants/implementations/examples use the particular order(s) in which the steps are shown and/or described.

The instructions (machine executable code) corresponding to the method steps of the embodiments, variants, implementations, and examples disclosed in this document may be embodied directly in hardware, in software, in firmware, or in combinations thereof. A software/firmware module may be stored in volatile memory, flash memory, Read Only Memory (ROM), Electrically Programmable ROM (EPROM), Electrically Erasable Programmable ROM (EEPROM), hard disk, a CD-ROM, a DVD-ROM, or other forms of non-transitory storage medium known in the art. Exemplary storage medium or media may be coupled to one or more processors so that the one or more processors can read information from, and write information to, the storage medium or media. In an alternative, the storage medium or media may be integral with one or more processors.

Selected disclosed methods, apparatus, and articles of manufacture provide efficient and effective ways to choose among several networks that can each provide service to a User Equipment, each operated by an MNO, each MNO associated with a PLMN. In accordance with the presently disclosed methods, apparatus, and articles of manufacture, a "PLMN code" or similar code is also associated with an enterprise network, such that each such enterprise network that is associated with a code can be identified by having its code included as an EHPLMN in an EHPLMN list. In some cases, if a UE enters the coverage area of an Enterprise LTE network, the UE will place the PLMN ID that is broadcast by the Enterprise LTE network into the EHPLMN of the UE. With the introduction of PLMNs for enterprise networks, a preference can be made to allow such enterprise network PLMNs to have a higher priority on the EHPLMN list than the HLPMN to enable the UE to camp on the enterprise system. In some embodiments, the PLMN associated with an enterprise network can also be placed in a HPLMN) list, a user PLMN (UPLMN) list or an operator PLMN (OPLMN) list. Accordingly, all of the features of the presently-disclosed methods, apparatus, and articles of manufacture associated with EHPLMN lists and the PLMNs in the EHPLMN list can also apply to PLMNs in each of the HPLMN list, UPLMN list and OPLMN list, and these lists themselves as well. However, for the sake of brevity, such features are detailed herein for the PLMNs in the EHPLMN list and the EHPLMN list itself. Nonetheless, it will be understood that such features are applicable to the PLMNs in these other lists, and to the other lists as well.

In some embodiments of the disclosed method, apparatus, and articles of manufacture, a UE has an HPPLMN timer that determines the period of scans performed by the UE when looking for higher priority systems. That is, when a UE is receiving service from a MNO or enterprise network that is associated with an EHPLMN that is not the first (highest priority) entry on the EHPLMN list, the HPPLMN will determine how long the UE will wait between attempts to find an MNO or enterprise network that is associated with an EHPLMN that is higher on the EHPLMN list.

In accordance with some embodiments of the disclosed method, apparatus, and articles of manufacture, in automatic mode, the UE selects the Cells with PLMNs in the following order:
  i) either the HPLMN (if the EHPLMN list is not present or is empty) or the highest priority EHPLMN that is available (if the EHPLMN list is present);
  ii) each PLMN/access technology combination in the "User Controlled PLMN Selector with Access Technology" data file in the SIM (in priority order);
  iii) each PLMN/access technology combination in the "Operator Controlled PLMN Selector with Access Technology" data file in the SIM (in priority order);
  iv) other PLMN/access technology combinations with received high quality signal (GSM–RLA≥–85 dBm, UTRAN FDD–CPICH RSCP above –95 dBm) in random order;
  v) other PLMN/access technology combinations in order of decreasing signal quality.

Accordingly, the EHPLMN list can contain both the HPLMN and one or more Enterprise PLMNs. The relative ordering between the HPLMN and Enterprise PLMN in the list can be specified. Based on the UE implementation, it is possible that the EHPLMN scan does not run, even when the UE is camped on a lower priority PLMN in the EHPLMN list. It can be seen that when the EHPLMN scans are run, the power consumption will be high and needs to be regulated. In some embodiments, different HPPLMN values can be associated with different PLMNs. In some embodiments, different HPPLMN values can also be associated with different UEs for the same PLMN. Furthermore, when a UE is camped on a lower priority network (i.e., a network associated with an EHPLMN that is not at the top of the EHPLMN list), the UE may be required to perform a search. Requiring the search to be performed for more preferred entries in the EHPLMN list improves some embodiments that support Enterprise PLMNs as more preferred systems.

In some embodiments, the search is performed at an interval associated with the HPPLMN associated with: (1) the UE and the PLMN on which the UE is currently camped; or (2) the HPPLMN having the lowest value (corresponding to the highest rate) and associated with an EHPLMN that is above (higher in priority than) the EHPLMN associated with the network on which the UE is currently camped, wherein an HPPLMN having any value (i.e., either a different value or the same value from the values of one or more of the other HPPLMNs associated with other EHPLMNs) may be associated with each different EHPLMN. Therefore, when camped on a lower priority entry, the shortest HPPLMN timer associated with the higher priority entry in the EHPLMN list may be used.

In accordance with other embodiments, the particular value of the HPPLMN can be dynamically set for each PLMN entry. In some embodiments, a HPPLMN timer of "0" (zero) indicates that EHPLMN scans should not be run, even when the current camped system is not the highest priority PLMN in the EHPLM list.

Allowing different HPPLMN timer values for each EHPLMN and for entry and exit within each, allows different entry and exit criteria when entering and leaving an enterprise network footprint. Also, having such flexibility allows MNOs to control the "aggressiveness" of the transitions across the MNO and enterprise networks, potentially based on the service level agreements (SLAs) established with the enterprise networks. Accordingly, the disclosed methods and apparatus provide greater flexibility to manage such configurations.

In some embodiments, the HPPLMN timer features noted above apply equally to closed subscriber group (CSG)/ neutral host ID (NHN-ID) based more preferred systems as well. For example, a system in which different values of HPPLMN timers are set for different networks servicing CSG/NHN-ID systems and the values for each are different when entering and exiting a network footprint.

In accordance with yet other embodiments, each entry in the EHPLMN list entry may be associated with a specific GEO fencing entity. In some embodiments, the UE performs EHPLMN scans for higher priority EHPLMNs in the EHPLMN list only when identified to be within the GEO fenced area (meeting entrance criteria). When no GEO fencing entity is associated with an EHPLMN in the EHPLMN list, the behavior is dictated by the HPPLMN timer setting. In some embodiments, the GEO fencing is used for both entering and leaving the enterprise network. If there are failures in accessing the GEO fenced information, scanning for a network associated with that PLMN may be disabled.

The references to specific GEO fencing services based on the type of system to be accessed can be extended to a shared Home Network Identifier (SHNI) based network selection. This can be done in addition to any of the other procedures defined for NHN-ID/CSG based system scans.

The use of independent GEO fencing services may enable better catering to individual enterprise deployments. Use of such GEO fencing allows flexibility for the enterprise deployments to independently learn and manage the required GEO fences that are regulated geographically as the network deployments grow and change.

In some embodiments, the GEO fencing features noted above apply equally well to closed subscriber group (CSG)/ neutral host ID (NHN-ID) based more preferred systems as well. For example, scans for networks in a CSG/NHN-ID system can be based on a UE being inside or outside GEO fences that are associated with each network (i.e., each PLMN or other identifying code).

In addition, in some embodiments, changes to the priority level of each PLMN within a prioritized list of PLMNs, such as the EHPLMN list, can be made based on the particular geographic location (geolocation/GPS coordinates) of a UE. In some such embodiments, the location of the UE is determined by whether the UE is inside or outside a particular GEO fence. Accordingly, the priority order of PLMNs within the particular prioritized lists in a UE may be dependent upon in which GEO fence(s) the UE is presently located.

Figure 5:
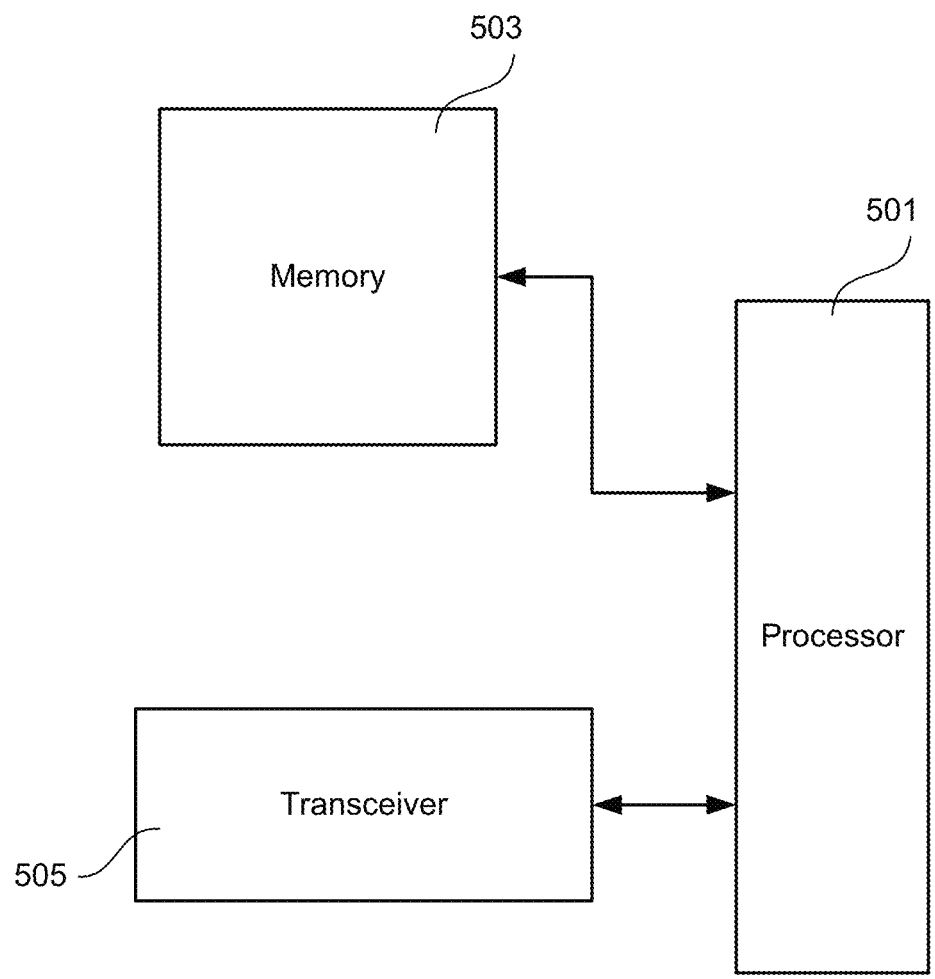
FIG. 5 is a schematic showing selected components of a UE configured in accordance with selected features described in this document.

FIG. 5 is a simplified schematic of a UE in accordance with the presently disclosed method and apparatus. A processor 501 is coupled to a memory 503. The processor is further coupled to a transceiver 505. The memory stores executable code that is provided to the processor to cause the processor to perform functions of the disclosed method and apparatus described above, including working with the transceiver to camp the UE on an EHPLMN associated with a current entry in an EHPLMN list of the UE; if the current entry is not a geofenced EHPLMN entry, then causing the transceiver to scan at least for an EHPLMN associated with a geofenced EHPLMN entry on the EHPLMN list; if the current entry is a geofenced EHPLMN entry, then determining whether the current entry has the highest priority of all geofenced EHPLMN entries on a EHPLMN list stored in the memory 503; if the current entry has the highest priority of all geofenced entries on the EHPLMN list, then causing the transceiver to discontinue scanning for EHPLMN; and if the current entry is a geofenced entry that does not have the highest priority of all geofenced entries on the EHPLMN list, then causing the transceiver to scan for an EHPLMN associated with a geofenced entry on the EHPLMN list having a higher priority than the current entry.

Although the disclosed methods, apparatus, and articles of manufacture are described above in terms of various examples, embodiments, variants, and implementations, it should be understood that the particular features, aspects and functionality described in one or more of the individual embodiments are not limited in their applicability to the particular embodiment with which they are described. Thus, the breadth and scope of the claimed invention should not necessarily be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The words "couple," "connect," and similar words/phrases/expressions with their inflectional morphemes do not necessarily import an immediate or direct connection, but include within their meaning connections through mediate elements. Unless otherwise noted or is clear from the context, devices may be coupled/connected wirelessly, optically, and in a wired manner. Connections may include buses and various network(s), including local area networks (LANs) and wide area networks (WANs) such as the Internet.

The word "criteria" as used in this document signifies both singular criterion and plural criteria.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Some definitions and clarifications have been explicitly provided above. Other and further explicit and implicit definitions and clarifications of definitions may be found throughout this document and the incorporated document(s).

Additionally, the various embodiments set forth herein are described with the aid of block diagrams, flow charts and other illustrations. As will become apparent to one of ordinary skill in the art after reading this document and examination of the attached drawings, the illustrated embodiments and their various alternatives can be implemented without confinement to the illustrated examples. For example, block diagrams and their accompanying description should not be construed as mandating a particular architecture or configuration.

The features and aspects described throughout this document and the incorporated document may be present individually, or in any combination or permutation, except where the presence or absence of specific features (elements/steps/limitations) is inherently required, explicitly indicated, or is otherwise made clear from the description. This applies whether or not features appear related to specific embodiments; thus, features of the different described embodiments may be combined.

What is claimed is:

1. A method of operating a User Equipment (UE), comprising:
   camping the UE on an Equivalent Home Public Land Mobile Network) (EHPLMN) associated with a current entry in an EHPLMN list of the UE;
   determining whether the current entry is a geofenced entry; if the current entry is not a geofenced EHPLMN entry, scanning at least for an EHPLMN associated with a geofenced EHPLMN entry on the EHPLMN list;
   if the current entry is a geofenced EHPLMN entry, determining whether the current entry has the highest priority of all geofenced EHPLMN entries on the EHPLMN list;
   if the current entry has the highest priority of all geofenced entries on the EHPLMN list, discontinuing scanning for EHPLMN; and
   if the current entry is a geofenced entry that does not have the highest priority of all geofenced entries on the EHPLMN list, scanning for an EHPLMN associated with a geofenced entry on the EHPLMN list having a higher priority than the current entry.

2. The method of claim 1, wherein the EHPLMN list comprises a plurality of entries, each entry being associated with a different EHPLMN of the UE and comprising an EHPLMN ID, at least one of the entries further comprising at least one associated Higher Priority PLMN (HPPLMN) timer value, wherein the HPPLMN timer value associated with a particular entry determines a period of scanning for the EHPLMN associated with the particular entry when the UE is not camped on the particular entry.

3. The method of claim 2, wherein:
   a plurality of the entries are geofenced entries associated with geofenced EHPLMNs; and
   the step of scanning at least for an EHPLMN associated with a geofenced EHPLMN entry comprises:
      determining the shortest geofence HPPLMN timer value among HPPLMN timer values of all geofenced EHPLMN entries on the EHPLMN list,
      setting the HPPLMN timer of the UE to the shortest geofence HPPLMN timer value among HPPLMN timer values of all geofenced EHPLMN entries, and
      searching for an EHPLMN associated with a geofenced EHPLMN entry.

4. The method of claim 3, wherein:
   if the current entry is not a geofenced EHPLMN entry, the UE scans only for an EHPLMN associated with a geofenced EHPLMN entry on the EHPLMN list.

5. The method of claim 4, wherein:
   if the current entry is a geofenced entry that does not have the highest priority of all geofenced entries on the EHPLMN list, the UE scans only for an EHPLMN associated with a geofenced entry on the EHPLMN list having a higher priority than the current entry.

6. The method of claim 3, wherein:
   the step of scanning for an EHPLMN associated with a geofenced entry on the EHPLMN list having a higher priority than the current entry comprises:
      determining the shortest geofence HPPLMN timer value among HPPLMN timer values of all geofenced EHPLMN entries with higher priority than the current entry on the EHPLMN list,
      setting the HPPLMN timer of the UE to the shortest geofence HPPLMN timer value among HPPLMN timer values of all geofenced EHPLMN entries with higher priority than the current entry, and searching for an EHPLMN associated with a geofenced entry on the EHPLMN list having a higher priority than the current entry.

7. The method of claim 2, wherein:
a plurality of the entries are geofenced entries associated with geofenced EHPLMNs; and
the step of scanning at least for an EHPLMN associated with a geofenced EHPLMN entry comprises:
determining the shortest geofence HPPLMN timer value among (a) HPPLMN timer values of all geofenced EHPLMN entries on the EHPLMN list and (b) of all non-geofenced EHPLMN entries having higher priority than the current entry on the EHPLMN list,
setting the HPPLMN timer of the UE to the determined shortest geofence HPPLMN timer value, and
searching for an EHPLMN associated with either a geofenced EHPLMN entry or a non-geofenced EHPLMN having higher priority than the current entry.

8. The method of claim 2, further comprising:
determining location of the UE;
wherein:
a plurality of the entries are geofenced entries associated with geofenced EHPLMNs, each geofenced entry being associated with entrance criteria; and
the step of scanning at least for an EHPLMN associated with a geofenced EHPLMN entry comprises:
determining the shortest geofence HPPLMN timer value among HPPLMN timer values of all geofenced EHPLMN entries on the EHPLMN list for which the UE meets associated entrance criteria;
setting the HPPLMN timer of the UE to the determined shortest geofence HPPLMN timer value; and
searching for an EHPLMN associated with a geofenced EHPLMN entry for which the UE meets the associated entrance criteria.

9. The method of claim 2, further comprising:
determining location of the UE;
wherein:
a plurality of the entries are geofenced entries associated with geofenced EHPLMNs, each geofenced entry being associated with entrance criteria; and
the step of scanning for an EHPLMN associated with a geofenced entry on the EHPLMN list having a higher priority than the current entry comprises:
determining the shortest geofence HPPLMN timer value among HPPLMN timer values of all geofenced EHPLMN entries on the EHPLMN list with higher priority than the current entry and for which the UE meets associated entrance criteria,
setting the HPPLMN timer of the UE to the determined shortest geofence HPPLMN timer value, and
searching for an EHPLMN associated with a geofenced entry on the EHPLMN list having a higher priority than the current entry and for which the UE meets the associated entry criteria.

10. A method of operating a User Equipment (UE), comprising:
camping the UE on an Equivalent Home Public Land Mobile Network (EHPLMN) associated with a current entry in an EHPLMN list of the UE;
determining a location of the UE;
determining whether the current entry is a geofenced EHPLMN entry;
if the current entry is not a geofenced EHPLMN entry, scanning for an EHPLMN associated with a geofenced EHPLMN entry on the EHPLMN list for which the UE meets entrance criteria;
if the current entry is a geofenced EHPLMN entry, determining whether the current entry has the highest priority of all geofenced EHPLMN entries meeting entrance criteria on the EHPLMN list;
if the current entry has the highest priority of all geofenced entries on the EHPLMN list among geofenced entries that meet the entrance criteria, discontinuing scanning for EHPLMN; and
if the current entry is a geofenced entry that does not have the highest priority of all geofenced entries on the EHPLMN list that meet the entrance criteria, scanning for an EHPLMN associated with a geofenced entry on the EHPLMN list having a higher priority than the current entry and meeting the entrance criteria.

11. The method of claim 10, wherein:
if the current entry is a geofenced EHPLMN entry that is not the highest priority geofenced EHPLMN entry, the UE scans only for a higher priority geofenced EHPLMN meeting the entrance criteria.

12. The method of claim 11, wherein:
if the current entry is not a geofenced EHPLMN, the UE scans only for a geofenced EHPLMN meeting the entrance criteria.

13. A User Equipment (UE) device, comprising:
memory storing machine-executable instructions and an Equivalent Home Public Land Mobile Network (EHPLMN) list;
a cellular transceiver; and
a processor coupled to the memory to execute the instructions and coupled to the transceiver;
wherein, when the processor configures the UE to:
implement an HPPLMN timer;
camp the UE on an Equivalent Home Public Land Mobile Network (EHPLMN) associated with a current entry in an EHPLMN list of the UE;
determine whether the current entry is a non-geofenced EHPLMN entry;
if the current entry not being a geofenced EHPLMN entry, scan at least for an EHPLMN associated with a geofenced EHPLMN entry on the EHPLMN list;
if the current entry is a geofenced entry, determine whether the current entry has the highest priority of all geofenced EHPLMN entries on the EHPLMN list;
if the current entry has the highest priority of all geofenced entries on the EHPLMN list, discontinue scanning for EHPLMN; and
if the current entry is a geofenced entry that does not have the highest priority of all geofenced entries on the EHPLMN list, scan for an EHPLMN associated with a geofenced entry on the EHPLMN list having a higher priority than the current entry.

14. The UE of claim 13, wherein the EHPLMN list comprises a plurality of entries, each entry being associated with a different EHPLMN of the UE and comprising an EHPLMN ID, at least one of the entries further comprising an associated Higher Priority PLMN (HPPLMN) timer value, wherein the HPPLMN timer value associated with a particular entry determines a period of scanning for the EHPLMN associated with the particular entry when the UE is not camped on the particular entry.

15. The UE of claim 14, wherein:

a plurality of the entries are geofenced entries associated with geofenced EHPLMNs; and when the processor further configures the UE to:

scan at least for an EHPLMN associated with a geofenced EHPLMN entry by determining the shortest geofence HPPLMN timer value among HPPLMN timer values of all geofenced EHPLMN entries on the EHPLMN list, setting the HPPLMN timer of the UE to the shortest geofence HPPLMN timer value among HPPLMN timer values of all geofenced EHPLMN entries, and searching for an EHPLMN associated with a geofenced EHPLMN entry.

16. The UE of claim 15, wherein, when the processor further configures the UE so that if the current entry is not a geofenced EHPLMN entry, the UE scans only for an EHPLMN associated with a geofenced EHPLMN entry on the EHPLMN list.

17. The UE of claim 16, wherein, when the processor further configures the UE so that if the current entry is a geofenced entry that does not have the highest priority of all geofenced entries on the EHPLMN list, the UE scans only for an EHPLMN associated with a geofenced entry on the EHPLMN list having a higher priority than the current entry.

18. The UE of claim 14, wherein:

a plurality of the entries are geofenced entries associated with geofenced EHPLMNs; and the processor further configures the UE so that the UE scans at least for an EHPLMN associated with a geofenced EHPLMN entry by:

determining the shortest geofence HPPLMN timer value among (a) HPPLMN timer values of all geofenced EHPLMN entries on the EHPLMN list and (b) of all non-geofenced EHPLMN entries having higher priority than the current entry on the EHPLMN list;

setting the HPPLMN timer of the UE to the determined shortest geofence HPPLMN timer value; and searching for an EHPLMN associated with either a geofenced EHPLMN entry or a non-geofenced EHPLMN having higher priority than the current entry.

19. The UE of claim 14, wherein:

a plurality of the entries are geofenced entries associated with geofenced EHPLMNs, each geofenced entry being associated with entrance criteria;

the processor further configures the UE to:

determine location of the UE;

scan at least for an EHPLMN associated with a geofenced EHPLMN entry having the shortest geofence HPPLMN timer value among HPPLMN timer values of all geofenced EHPLMN entries on the EHPLMN list for which the UE meets associated entrance criteria;

setting the HPPLMN timer of the UE to the shortest geofence HPPLMN timer value; and searching for an EHPLMN associated with a geofenced EHPLMN entry for which the UE meets the associated entrance criteria.

20. An article of manufacture comprising at least one non-volatile machine-readable storage medium with program code stored in the at least one non-volatile machine-readable storage medium, the program code comprising instructions to configure a User Equipment (UE) device to:

implement a Higher Priority Public Land Mobile Network (HPPLMN) timer;

camp the UE on an Equivalent Home Public Land Mobile Network (EHPLMN) associated with a current entry in an EHPLMN list of the UE;

determine whether the current entry is a non-geofenced EHPLMN entry;

in response to the current entry not being a geofenced EHPLMN entry, scan at least for an EHPLMN associated with a geofenced EHPLMN entry on the EHPLMN list;

in response to the current entry being a geofenced entry, determine whether the current entry has the highest priority of all geofenced EHPLMN entries on the EHPLMN list;

in response to the current entry having the highest priority of all geofenced entries on the EHPLMN list, discontinue scanning for EHPLMN; and in response to the current entry being a geofenced entry that does not have the highest priority of all geofenced entries on the EHPLMN list, scan for an EHPLMN associated with a geofenced entry on the EHPLMN list having a higher priority than the current entry.

* * * * *